Figures 1, 2:
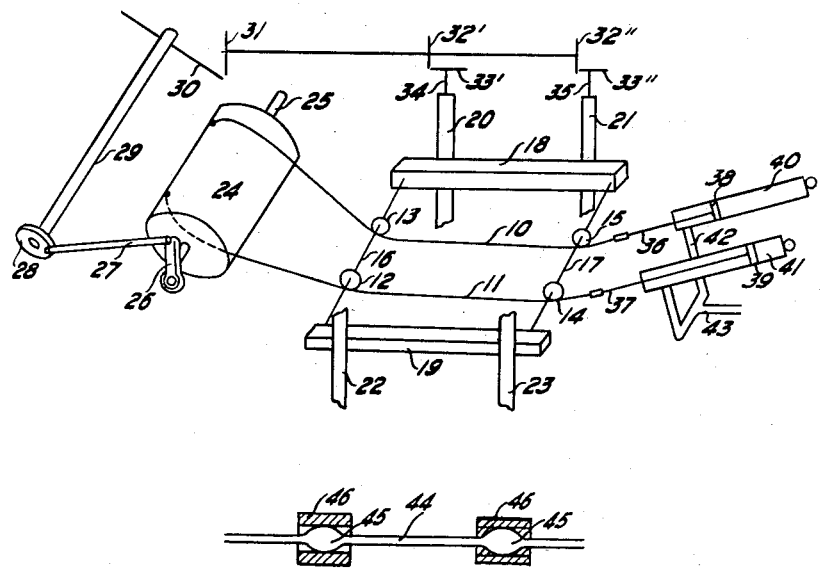

June 10, 1952  P. JAKOBSSON ET AL  2,599,920
APPARATUS FOR SEVERING PLASTIC BODIES
Filed May 24, 1949

INVENTORS
BY
ATTORNEY

Patented June 10, 1952

2,599,920

UNITED STATES PATENT OFFICE 2,599,920

APPARATUS FOR SEVERING PLASTIC BODIES

Per Jakobsson, Hallabrottet, and Wilhelm Sebardt, Nockeby, Sweden, assignors to International Ytong-Stabalite Company Ltd., London, England, a corporation of Great Britain Application May 24, 1949, Serial No. 95,064
In Sweden June 7, 1948

7 Claims. (Cl. 25—108)

In the production of porous artificial stones, it has been the practice to produce a mass of a material containing silicic acid, for instance slate ashes or siliceous marl, and a material containing lime, for instance quicklime or unburnt lime or certain puzzalanic materials or cement which gives off lime in its decomposition. These materials were ground into very fine state and were mixed with water, a metal, for instance aluminum, in powder form thereafter being added, said metal reacting with the lime with formation of hydrogen gas. The mass was molded into large molds, where it, due to gas generation in the form of bubbles, increased its volume and at the same time was transformed into a plastic consistency. This volume increase has also been called "fermentation," a word that will hereinafter be used. In its plastic consistency the mass has been divided, so that stones of predetermined sizes were formed, viz. of the form and size desired. Thereafter the mass has been hardened into stonelike consistency, usually under so called steam hardening in an autoclave, where it, during a time of about 10-20 hours, was subjected to a steam pressure of about 8-10 atmospheres. The dividing of the mass into stones of the desired form and size has caused great difficulties, because certain requirements as to the surface character of the stones have to be satisfied, in order to maintain good quality of the building material thus formed. Earlier it was usual to cut the stones by means of even "knives," which were moved downwardly through the material with a zigzag motion, so that first one end of the knife was pressed down a distance, thereafter the other end, and so on, until the bottom was reached. Thereafter the knife was again brought up through the mass.

Stones, cut in this way by means of knives, showed, however, a smooth face, to which plaster adhered very badly. Further the mass which was, before the knife was driven through it, situated in the cut groove, was displaced into the material, thereby increasing its density close to the cut, so that a thick skin of less porous material was formed. This skin, under unfavorable circumstances, could cause such interior stress in the material, for instance when subjected to extreme cold, that the skin loosened and flaked off, to the detriment of the building structure.

Several experiments have thereafter been made in order to find a reliable method of dividing the mass in accordance with the size of the artificial stones desired, and finally it has been found most suitable to divide the mass by means of saws of a special structure. These have given the surface of the mass in the cuts a rough and uneven character to which the mortar and the plaster stick very easily.

One disadvantage with the use of saws of this type was that the saws had to be withdrawn again from the cut and during this movement they pressed down the chips formed during the sawing action to a certain amount. The mass, during this movement being plastic and continuously hardening, there was a risk of the chips being broken off at their base so that they would loosen afterwards. Therefore, even if the use of saws for dividing the mass resulted in improvement over knives, it is obvious that this use did not present the best means of dividing.

It has also been proposed to divide plastic masses, however not light concrete, by sawing by means of a chain, a twisted double thread, or a wire formed by usual basket plaiting from three or more threads, or the like, and it has also been proposed, when using a twisted double thread to provide conical saw-tooth bodies between the two thread parts, said bodies extending with their points in each direction from the twisted thread. Tests with such arrangements for sawing light concrete have, however, not given satisfactory results. This seems to depend upon the fact that the plastic mass has had a certain tendency to stick to the thread, so that the mass has followed the movement of the thread. Thus, the mass has, so to say, in effect built up a covering around the sawing means, thus decreasing the efficiency of that means, and further making the surface of the cut smooth. For the latter reason, the light concrete did not provide adherent capacity for mortar and plaster.

It has also been attempted to cut the light concrete mass by transverse movement of one single smooth thread, but this too has proved to be unsatisfactory, because the thread has shown a certain tendency to cut in inclined direction, and therefore very complicated arrangements were necessary to ensure an even movement in one single plane of the threads. In spite of these complicated arrangements, however, insufficient reliability was obtained. Further, it is impossible with one single smooth thread to get down to the bottom of the mold without supporting the thread at several points. Such supports introduce difficulties, because the supports must be brought down through the mass and adversely affect the artificial stones thus obtained. If the thread is not supported at a plurality of points, it will take the form of a bow from one edge to the other of the mass, and inside that bow there will be a piece of the mass that has not been cut.

The present invention is based upon the conception that all these difficulties can be removed, if a single thread is used as the cutting or sawing means, such thread being preferably of even thickness and in which at certain intervals suitable tooth-formed means are provided. These tooth-formed means may consist of points, attached by welding, burbs or short pieces of thread, but they may also consist of bricks, pellets, balls or the like, mounted on the thread and welded or in some other way fixed to the thread. It has finally proved that one suitable form of the invention is obtained by forming a series of usual overhand knots or fret bends on the metal thread used.

As a rule, the best form will be one in which the saw tooth pieces are placed circularly symmetrically about the thread, because experience has proved that if they are not placed in this way, they will easily, under the sawing action, take an inclined position, causing less resistance during the sawing action and, therefore, also a smoother surface of the cut.

In all earlier tests it was assumed that the sawing action must take place by moving the saw means horizontally in one direction, or perhaps, in a to and fro movement, simultaneously feeding the saw means in a vertical direction downwardly. It also was assumed that it would be impossible to divide the mass by giving the saw means a unidirectional or to and fro movement in horizontal direction and feeding the saw means simultaneously in another horizontal direction, preferably perpendicular to the first mentioned one, because the mass, placed above such a horizontal cut, would by its own weight cause a melting or welding together of the two parts. This will be the case if the surfaces on each side of the cut are sufficiently smooth. Tests made in connection with the present invention have, however, proved that no such melting or welding together between the two parts on each side of the cut will take place, if the cut is made according to the present invention. To the contrary it is very easy, after the mass has been hardened by steam hardening to divide the same by breaking the different parts away from each other which have been obtained by the process according to the present invention.

This is of especially great importance in connection with the production of thin plates, in the first place armature proof plates of porous artificial stone, because such plates were previously always made standing on their edges, which, however, caused certain disadvantages.

Amongst these disadvantages it should be mentioned that the plates, if they are very large, will be subjected to different pressures in the mold in their lower end and in their upper parts, respectively, so that one and the same plate, molded standing on its edge, will not be uniform in its lower and upper parts. After mounting the plate horizontally, this will result in different porosities in the left hand and right hand parts. Also the mounting of the armature has caused difficulties, when molding the plates standing on their edges. Finally it has proved to be impossible to mold plates of predetermined height, if they are molded standing on their edges, because the weight of the mass has caused certain variations in the sizes of the plates. Now, the plates may be made larger without any such disadvantages occurring, by being molded in horizontal position and cut in accordance with the present invention.

Also when molding brick stones or the larger artificial stones, known as gasconcrete stones, which usually have the size of 20 x 25 x 50 cm., the present invention has a certain advantage. It has proved advantageous to make the molds of a height corresponding to the largest side of the stone, which means, in the above mentioned example, 50 cm. However, this will mean that when the stones have been cut out of the mass in the mold, the four vertical sides will have a rough surface, and also the upper side will have a rough surface, because it has been formed by the scraping off of the surplus of the mass after the fermentation has ceased. However, the bottom surface of the artificial stone will be molded directly upon the bottom of the mold, and it will therefore be smooth. According to the present invention it will be possible to make the mold for instance 1 cm. higher, and thereafter to cut away a thin layer of 1 cm. at the bottom of the mold, so that all six sides of the artificial stone will have the rough surface, desired in order for mortar and plaster to set and stick well to the stones.

Therefore, it is understood that according to the present invention the mass in the mold may be cut in all three dimensions that is, in two vertical dimensions, perpendicular to each other and also in the horizontal dimension.

It is also understood that it will be necessary to lower the four or at least two of the side walls of the mold before cutting, in order that the saw means shall have sufficient working space on both sides of the cut. By doing so, however, the mass loses the support which it, otherwise, would have had from the sides of the mold, and it has now proved that this circumstance in connection with the strain caused on the mass parts from the saw means has caused certain disadvantageous actions.

Thus, the friction between the saw means and the divided sized bodies of plastic mass has been so great that the plastic bodies have shown a certain tendency to follow the saw means in its movement, and thus to be thrown out of contact with the bottom of the mold.

This disadvantageous effect is decreased but not fully removed by using smooth threads with saw-tooth means according to the present invention. This improvement, however, is not sufficient, as it has proved that the blocks still have a tendency to be thrown out of the mold, especially when the molded plastic mass has been sawn in one direction and is to be sawn in the other direction, so that the sized bodies are much smaller and therefore also have less weight.

According to a further development of the present invention these disadvantages are removed by dividing the saw means in at least two groups, the saw means in these groups being arranged to move in mutually different phases of movement. It is especially suitable to divide the saw apparatus in two groups of saw means, so provided that they have a phase of movement of 180° difference, that is, when the saw means of one group is moving in one direction, the saw means of the other group should be moving in exactly the opposite direction, and the saw means of both groups should change direction of movement simultaneously.

If one takes care that every second saw means belongs to the first group and every second to the second one of these groups, it is obvious that every sized body will, on its one side, be influenced by a friction which will, perhaps, act in such direction that the body would be thrown out of the mold, but simultaneously a force will act on the other side of said body, trying to keep the sized body in its place in the block. Therefore there will be no resulting displacement force, and even if a rotational or a turning moment occurs, it has proved in practice that this can not cause any observable turning of the elements of the block.

This method for sawing plastic masses is of advantage also in other ways. Thus, one has earlier had some experience of the mold as a unit having a tendency to vibration or move to and fro in connection with the group of saws, provided that this group has contained only one number of saw means in parallel action. This tendency has caused a certain risk of the saw means cutting in inclined direction due to the vibration movement of the mold, and if one wanted to be sure against this risk, it was necessary to provide for a very effective and expensive locking arrangement for keeping the mold with its content in its place. The presence of such locking arrangement has further caused a certain waste of time, because it was necessary to lock the mold, before beginning the sawing action, but after the mold had been transported to its place under the sawing apparatus, and this took a certain time.

When using the last mentioned form of the invention, there will be no side strain, either at the mold as a unit or on the different sized bodies in the mold, and therefore it has proved possible to increase the feeding speed of the sawing action so that a further gain of time has been made. The increase of the feeding speed is made possible by the ability to give the saws themselves an increased speed of movement in the direction of the sawing movement. Thus, in experiments in connection with the present invention, it has proved possible to increase the sawing speed to four times the speed, earlier regarded as maximum, and these experiments have given very good results.

The increased speed of sawing in connection with simultaneous increased speed of the feeding of the saw means, it even being possible to increase the latter speed more than the first mentioned, results in obtaining a material increase of the unevenness of the surface of the saw cut without any tendency to detrimental size changes, for instance resulting from the saw means cutting in inclined directions or the like. For the production of sized bodies for building purposes, it is of very great importance that these bodies have the above mentioned rough surface, and the rougher the surface is, the better the plaster or mortar will stick to the stones.

A further advantage of the above described method of dividing is that according to this invention one can divide the contents of the mold in a different way than was hitherto possible. Thus, for instance, it has according to earlier known and used methods not been possible to cut the contents of a mold in so thin and parallel plates as was desirable for certain purposes, and thereafter to divide these plates in smaller parts by one or possibly two cuts, perpendicular to each other and to the first mentioned cut, because the sized bodies, thus produced were too light and, consequently they followed the saw means in their movements. Such method of dividing, however, is made possible according to the present invention.

In the attached drawing, Fig. 1 shows an arrangement for execution of the above described method, and Fig. 2 shows a part of the saw means according to Fig. 1, partly in section.

In order to simplify the explanation, it is assumed that only two saw means are used, although, of course, there will in practical cases be a considerable number of saw means. The two saw means consist of two single threads or strands 10 and 11, provided with saw-tooth means of some suitable kind, for instance as shown in Fig. 2 and hereafter described.

The threads 10 and 11 are guided over rollers 12, 13, 14 and 15, provided on shafts 16 and 17, which in their turn are mounted in frames 18 and 19. These are combined with each other and with two pairs of guides 20 and 21 and also 22 and 23, each containing a screw for the displacement downwardly of the frames to correspond to the feeding of the saw means 10 and 11.

For causing the movement of the saw means these are at one end attached to a drum 24, viz. in such a direction that they are wound about one quarter of a turn about the drum, however, in different directions respectively. The shaft 25 of the drum 24 is combined with an arm 26 which is actuated by a link arm 27, the other end of which is eccentrically connected to a disc 28, driven by the drive shaft 29 of the apparatus. Finally, over a power transfer arrangement including the bevel gearing 30—31 and 32'—33' as well as 32"—33" the shaft 25 is connected to the shafts 34 and 35, respectively, of the feeder arrangement. These shafts are threaded to provide the feeding movement. A similar power transfer arrangement to the shafts in the guides 22 and 23, has been omitted in the figure in order to get a clearer drawing, but it will be obvious to anyone skilled in this art, without any further explanation, how this is done.

For providing the correct tension in the saw means 10 and 11, the ends of these means remote from the drum 24 are connected to rods 36 and 37, respectively, at the ends of these rods pistons 38 and 39 are provided which are movable in cylinders 40 and 41, respectively. The cylinders 40 and 41 are in communication by way of a conduit 42 which is attached to the spaces in front of the pistons 38 and 39. The conduit 42 is connected to a source of pressure medium, for instance pressure air (not shown in the drawing) by conduit 43.

The operation of this arrangement is as follows: When the shaft 29 is rotated by the driving motor, the eccentric disc 28 oscillates the drum 24, the drum moving about one quarter of a turn in one direction and thereafter in the other direction. The saw means 10 and 11 connected to the drum thereby are given the desired to and fro or reciprocating movement, but it should be observed that one saw means (or one group of saw means) is always moving in counterphase to the other saw means (or the other group of saw means, respectively). The necessary tension is given to the saw means from the source of pressure air from the conduit 43. This tension is equally divided on the two saw means, because the conduit 42 provides that an equal amount of pressure air leaves one of the cylinders as is consumed by the other one of the cylinders, the pressure therefore not being subject to any change due to the movement of the pistons. To the contrary it has even proved that a certain resistance in the conduit 42, acting on the pressure medium, may be advantageous for an easy working of the saw means.

Simultaneously with the saw means being driven in a to and fro movement in the above manner, a suitable feeding movement is transferred to the feeding means in such a way that the shaft 29 over the bevel gearings 30—31 and 32—33 drives the threaded shafts 34 and 35, respectively (as well as the corresponding shafts in the guides 22 and 23) the guiding arrangement together with the shafts 16 and 17 of the rollers 12—15 thus being moved downwardly at a selected speed.

Now it is obvious that the threads 10 and 11 may be of any of the suitable kinds described above. However, it has proved that the special form of said threads, shown in Fig. 2 is very suitable. In this figure 44 is the smooth and even thread or strand, for instance made of steel, used as a carrier for the saw means. At equal distances this thread has been flattened by pressing or punching, as shown at 45. Over these flattened parts 45, thereafter small pieces of tubular form 46, are placed. These pieces thereafter are rolled to a smaller diameter, so that they closely engage the flattened parts 45 of the wire 44, as shown at the right side of Fig. 2.

It is obvious that this invention is not limited to the mechanical driving arrangement shown above as one form of the invention. In the first place it should be observed that one may with advantage arrange for a greater number of saw means which should alternately be connected to the under side and to the upper side of the drum 24, so that every second saw means moves to the left in the figure, when the others move to the right. Also the feeding arrangement and the arrangement for giving necessary tension to the saw means may be formed in many different ways, without departing from the scope of this invention.

By using pneumatic or possibly hydraulic tension arrangement for the saw means the great advantage is obtained that all the saw means get the same tension, and one may also vary the tension as desired during the sawing process. Especially it may be suitable, immediately before the saw means leave the mass, to decrease the tension of the threads in order thereby to decrease the tendency of said saw means of loosening parts of the material on the upper surface.

In the above described example the sawing takes place with horizontal movement and with vertical feeding. However, it is obvious that one may vary the different directions of the sawing movement itself as well as the feeding movement in any desired manner. Further, the sawing has been described as a to and fro movement. It is true that such a movement will give a rougher and therefore better surface to the sized bodies formed by the sawing process, but also sawing with continuous movement in one direction is possible with the present invention.

What is claimed is:

1. Apparatus of the character described comprising a plurality of strand-like sawing members, means for supporting said members with adjacent members in predetermined spaced relation corresponding to the desired distance between opposite sides of a unit to be sawn by said members, means for reciprocating said members in spaced relation in substantially a common plane and with adjacent members in out-of-phase movement with respect to each other and means for simultaneously feeding said members in a direction substantially normal to the plane of reciprocation thereof.

2. Apparatus as defined in claim 1, in which the means for supporting and reciprocating said members comprises a drum to which said members are attached at one end and wrapped in different peripheral directions respectively, and means for oscillating said drum.

3. Apparatus as defined in claim 1, in which the means for reciprocating said members includes fluid pressure actuated tensioning means acting on one end of each of said members.

4. Apparatus as defined in claim 3, in which said fluid pressure actuated means comprises cylinders, pistons in said cylinders to which the ends of said members are connected and a balancing conduit for pressure fluid connecting the pressure spaces of different cylinders to equalize the tension on different sawing members.

5. Apparatus of the character described comprising a frame, guide rollers carried by said frame for guiding a plurality of strand-like sawing elements in spaced relation in substantially a common plane, strand-like sawing members engaging said rollers, a drum, means for oscillating said drum, adjacent ones of said members being attached to said drum and wrapped thereon peripherally in opposite directions, tensioning means for applying tensioning force to the opposite ends of said members, said drum and said tensioning means being operative to cause said members to be reciprocated between said rollers in out-of-phase relation when said drum is oscillated, and means for moving said frame in a direction substantially normal to the plane of reciprocation of said members.

6. Apparatus as defined in claim 5, including a rotatable driving shaft and eccentric means connecting said driving shaft and said drum to oscillate the latter when the shaft is rotated.

7. Apparatus as defined in claim 6, including means actuated by rotation of said driving shaft for moving said frame.

PER JAKOBSSON.
WILHELM SEBARDT.

REFERENCES CITED

The following references are of record in the file of this patent:

UNITED STATES PATENTS

| Number | Name | Date |
|---|---|---|
| 1,405,671 | Crozier | Feb. 7, 1922 |
| 1,726,863 | Singer | Sept. 3, 1929 |
| 2,049,171 | Osgood | July 28, 1936 |
| 2,050,761 | Newsom | Aug. 11, 1936 |
| 2,095,714 | Pinaud et al. | Oct. 12, 1937 |

FOREIGN PATENTS

| Number | Country | Date |
|---|---|---|
| 422,741 | Great Britain | Feb. 9, 1933 |